US012600439B2

(12) United States Patent
McNeely

(10) Patent No.: US 12,600,439 B2
(45) Date of Patent: Apr. 14, 2026

(54) ILLUMINATED MARINE LADDER

(71) Applicant: Jarrett McNeely, Metairie, LA (US)

(72) Inventor: Jarrett McNeely, Metairie, LA (US)

(73) Assignee: Jarrett McNeely, Metairie, LA (US)

( * ) Notice: Subject to any disclaimer, the term of this patent is extended or adjusted under 35 U.S.C. 154(b) by 587 days.

(21) Appl. No.: 18/011,381

(22) PCT Filed: Sep. 22, 2021

(86) PCT No.: PCT/US2021/051532
§ 371 (c)(1),
(2) Date: Dec. 19, 2022

(87) PCT Pub. No.: WO2022/066751
PCT Pub. Date: Mar. 31, 2022

(65) Prior Publication Data

US 2023/0234676 A1 Jul. 27, 2023

Related U.S. Application Data

(60) Provisional application No. 63/081,487, filed on Sep. 22, 2020.

(51) Int. Cl.
*E06C 1/56* (2006.01)
*B63B 27/14* (2006.01)
*E06C 7/00* (2006.01)

(52) U.S. Cl.
CPC .............. *B63B 27/146* (2013.01); *E06C 1/56* (2013.01); *E06C 7/003* (2013.01)

(58) Field of Classification Search
CPC .......... E06C 1/56; E06C 7/003; B63B 27/146
See application file for complete search history.

(56) References Cited

U.S. PATENT DOCUMENTS

| | | | | | |
|---|---|---|---|---|---|
| 1,349,125 | A * | 8/1920 | Full | B63B 27/14 | 182/228.1 |
| 4,442,920 | A * | 4/1984 | Gronbeck | E06C 7/081 | 182/199 |
| 4,655,321 | A * | 4/1987 | Salvarezza | E06C 1/56 | 182/228.1 |
| 5,074,236 | A * | 12/1991 | Robertson | B63B 27/14 | 182/196 |
| 5,704,447 | A * | 1/1998 | Doyle | E06C 7/08 | 182/196 |
| 8,701,829 | B1 * | 4/2014 | Wyne | E06C 1/56 | 182/136 |
| 9,333,383 | B1 * | 5/2016 | Barton | A63B 23/03525 | |
| 10,189,548 | B1 * | 1/2019 | Moore | B63B 45/04 | |
| 11,440,627 | B1 * | 9/2022 | Neibert | B63B 79/10 | |
| 2007/0034248 | A1 * | 2/2007 | Romano | H02S 20/20 | 136/291 |

(Continued)

*Primary Examiner* — Paola Agudelo
(74) *Attorney, Agent, or Firm* — Kean Miller LLP; Lauren J. Rucinski; Taylor Dunne

(57) ABSTRACT

A marine ladder comprising a plurality of steps and spreaders used for pilot or seaman access to vessel. The ladder comprises a plurality of illumination means positioned along the steps of the marine ladder. In one or more embodiments, the illumination means are also positioned along the spreaders. A means to power the illuminators is preferably a solar panel located on one or more of the spreaders.

5 Claims, 10 Drawing Sheets

(56) References Cited

U.S. PATENT DOCUMENTS

| | | | | |
|---|---|---|---|---|
| 2009/0065303 | A1* | 3/2009 | Davies | B63B 27/146<br>182/196 |
| 2009/0139798 | A1* | 6/2009 | Bernard | E06C 7/003<br>182/18 |
| 2014/0261145 | A1* | 9/2014 | Neese | B63B 27/14<br>114/362 |
| 2016/0356086 | A1* | 12/2016 | Saccoccio | E06C 7/00 |
| 2017/0058601 | A1* | 3/2017 | Salvarezza | E06C 1/56 |
| 2017/0145747 | A1* | 5/2017 | Salvarezza | E06C 1/56 |
| 2017/0314328 | A1* | 11/2017 | Friedman | E06C 7/003 |
| 2018/0354424 | A1* | 12/2018 | Maiorana | E06C 7/003 |
| 2023/0321309 | A1* | 10/2023 | Armijo | A61L 2/26 |

* cited by examiner

ILLUMINATED MARINE LADDER

CROSS-REFERENCE TO RELATED APPLICATIONS

This application is a 35 USC § 371 National Stage application of International Application No. PCT/US21/51532 filed Sep. 22, 2021, which claims the benefit under 35 USC § 119(e) to U.S. Application Ser. No. 63/081,487 filed Sep. 22, 2020. The disclosure of each of the prior applications is considered part of and is incorporated by reference in the disclosure of this application.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Illuminated Marine Ladder, which may be embodied in various forms. It is to be understood that in some instances, various aspects of the invention may be shown exaggerated or enlarged to facilitate an understanding of the invention. Therefore, the drawings may not be to scale.

FIELD OF THE INVENTION

Figure 1:
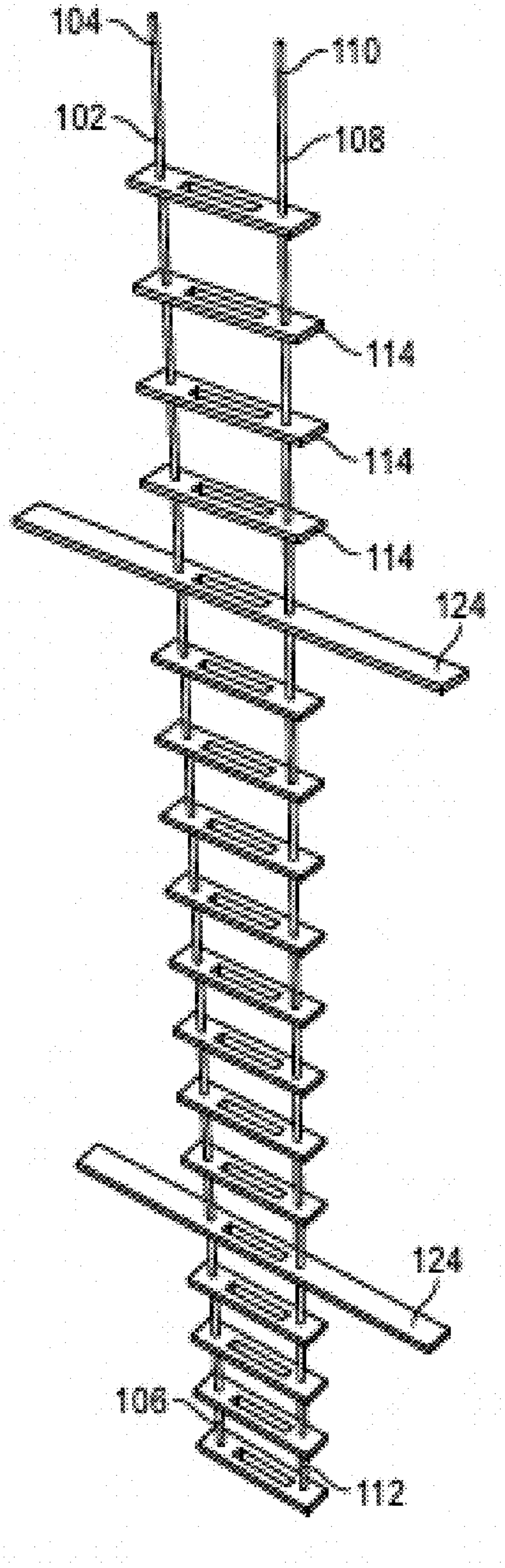
FIG. 1 shows an embodiment of the inventive ladder with steps and spreaders.

This invention relates to marine ladders. In particular, it relates to marine ladders used for embarking and disembarking a vessel.

BACKGROUND

Industries across the globe are constantly striving to promote safety and reduce injury. An entire area of federal law exists related to maritime safety and injury. As such, the maritime industry and industries which rely upon shipping are particularly concerned with offering services in the safest manner possible. Ladders remain the most common means for personnel to embark and disembark from the vessel. And despite the fact that marine ladders are an integral part of operation and used daily on nearly all types and sizes of vessels, they remain traditional in approach and have largely been ignored in terms of advancements in safety.

An illustrative example of the common marine ladder which is due for safety enhancements is the pilot ladder. Pilots may board vessels or ships to assist the crew during critical and hazardous phases of a voyage. Because pilots must board while the ship away from a dock, boarding requires pilots to move from one vessel to another. To assist boarding or disembarking a vessel, pilots use pilot ladders, a specialized form of a rope ladder regulated by the International Convention for the Safety of Life at Sea ("SOLAS") regime. While pilot ladders are relatively easy to deploy along a side of a ship and store on board, pilot ladders are particularly dangerous.

Many pilots and other seaman have fallen from pilot ladders and been seriously or fatally injured. Embarking and disembarking vessels at night is particularly dangerous, as very little, if any, light is available to illuminate a ladder. Still, despite the obvious risks associated with this process, marine ladders remain relatively traditional. The instant application discloses a marine ladder with additional safety features designed to assist the safe embarkation and disembarkation of a ship in all conditions.

Prior art ladders have included lights within steps, rungs, or other parts of the ladder. For example, the prior art shows a marine or other application ladder that includes lights recessed within a step. However, none have presented a solution for a flexible/rolling ladder or for spreaders. Prior art ladders that include lights are not specifically tailored to meet the requirements of a pilot ladder, including the restrictions under the SOLAS regime. Accordingly, what is needed is an illuminated pilot ladder operable to enable a pilot to safely board or disembark a vessel. The prior art falls short in at least the following ways.

Prior art shows solar receptors built into steps and as standalone units mounted on vessels. These prior art configurations have disadvantages, including that the solar cells are typically made of glass and are therefore prone to breaking and causing slipper surfaces based on the low friction coefficient whenever a pilot or seaman steps on the ladder steps. Here, the inventive ladder includes solar panels located on the spreaders. This means that the solar panels will not be stepped on when the ladder is in use and do not need to be mounted on the vessel. Furthermore, when the ladder is rolled up, the spreaders will not be tucked into the roll, allowing solar light to continue to contact the photoreceptor sells on the spreader.

The prior art also fails to accommodate the type of rolled ladder used for marine pilot ladders. Thus, prior art ladders have a defined proximal and distal end and left and right side. Here, the inventive ladder can be unfurled without regard to the ends or sides.

Finally, the prior art does not account for the need to easily replace the components of the pilot ladder, including the lights. Pilot ladders are used in a rugged and marine environment. Thus, the lights and other components may need to be replaced frequently. The inventive ladder here further provides for use of a pop-out light to facilitate this need.

SUMMARY OF THE INVENTION

Claimed herein is a marine ladder for use as a pilot ladder as known in the art. The ladder comprises a plurality of steps and spreaders. Marine lights are positioned in recesses on the steps, or the spreaders, or both. The marine lights are positioned so as to provide maximum illumination along the ladder to create a safer environment for the seaman or pilot when climbing the ladder. In additional embodiments, lighting systems may be incorporated into or on the ropes.

The ladder may be connected directly to the vessel's power through a power harness. The ladder may also feature its own power means, such as through a solar panel device positioned preferably on one or more spreaders. The ladder may also use a combination of its own power means and pull power from the vessel.

The ladder provides an improvement over the prior art because it addresses issues such as visibility, power source availability, slippery steps, and deployment configuration restrictions.

In one or more embodiments, the ladder comprises two opposing rails or ropes, a plurality of steps or rungs attached to said ropes and spaced vertically on top of each other such that the ropes are substantially parallel to each other, a series of connector pieces attaching said rungs or steps to the ropes, and one or more spacers located in the place of a step or run at a predetermined interval not greater than one in every nine steps.

In one or more embodiments, the septs are selected from the group comprising aluminum, wood, plastic, composite, or a combination thereof.

In one or more embodiments, the ropes are selected from the group comprising synthetic rope, natural rope, hemp rope, manilla rope, and nylon rope. In one or more embodiments, the diameter of the rope should be greater than 50 mm, and preferably greater than 57 mm. In a preferred embodiment, the rope is mold and mildew resistant. In one embodiment, the rope is a heat-treated polyester rope with a polypropylene core.

In one or more embodiments, at least one step or rung comprises wood. In alternate embodiments, at least one step or run comprises a composite material.

In a preferred embodiment, the spreader is an elongated step or rung that extends out beyond the ropes. Furthermore, in a preferred embodiment, the spreader is inserted for the rung or step every 5 to 8 steps. In a preferred embodiment, the spreader is sized to meet regulations, and may be at least 1.8 meters.

In one or more embodiments, the steps and/or spreaders are attached to the rope through a connector means, which may be as simple as a knot in the rope or a mechanical connector such as a clip or a clamp. In a preferred embodiment, the connector means is a rope thimble.

In one or more embodiments, a lighting mechanism may be embedded in the top surface of one or more steps or spreaders. In a preferred embodiment, the lighting mechanism is flush with the surface of one or more steps or spreaders. In alternate embodiments, the lighting mechanism may be attached to the rope. In such an embodiment, the lights may be connected to or embedded in the connector.

In a preferred embodiment, the lighting mechanism is an LED or other light source capable of emitting light at a low power consumption.

In a preferred embodiment, the lighting mechanism is an easily removable LED light source that can be inserted in and out of socket.

The lighting mechanism may be powered by a power source selected from AC current, DC Current, battery powered, or solar powered. In a preferred embodiment, the lighting mechanism is powered by a combination of two or more of the foregoing. In a further preferred embodiment, the lighting mechanism is connected to a controller capable of turning the lights on and off.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

In accordance with embodiments of the invention, an illuminated marine ladder 100 is provided, as illustrated in FIGS. 1-10. For ease of reference, the directions of the rope are defined herein as "left", "right", "proximal", and "distal." However, in one or more embodiments, the illuminated ladder may be deployed in a number of configurations without regard to these directional definitions. The lights and apertures discussed below are located so as to allow the ladder to be rolled and unfurled without regard to a "left"/"right" or "proximal"/"distal" configuration.

Figure 8:
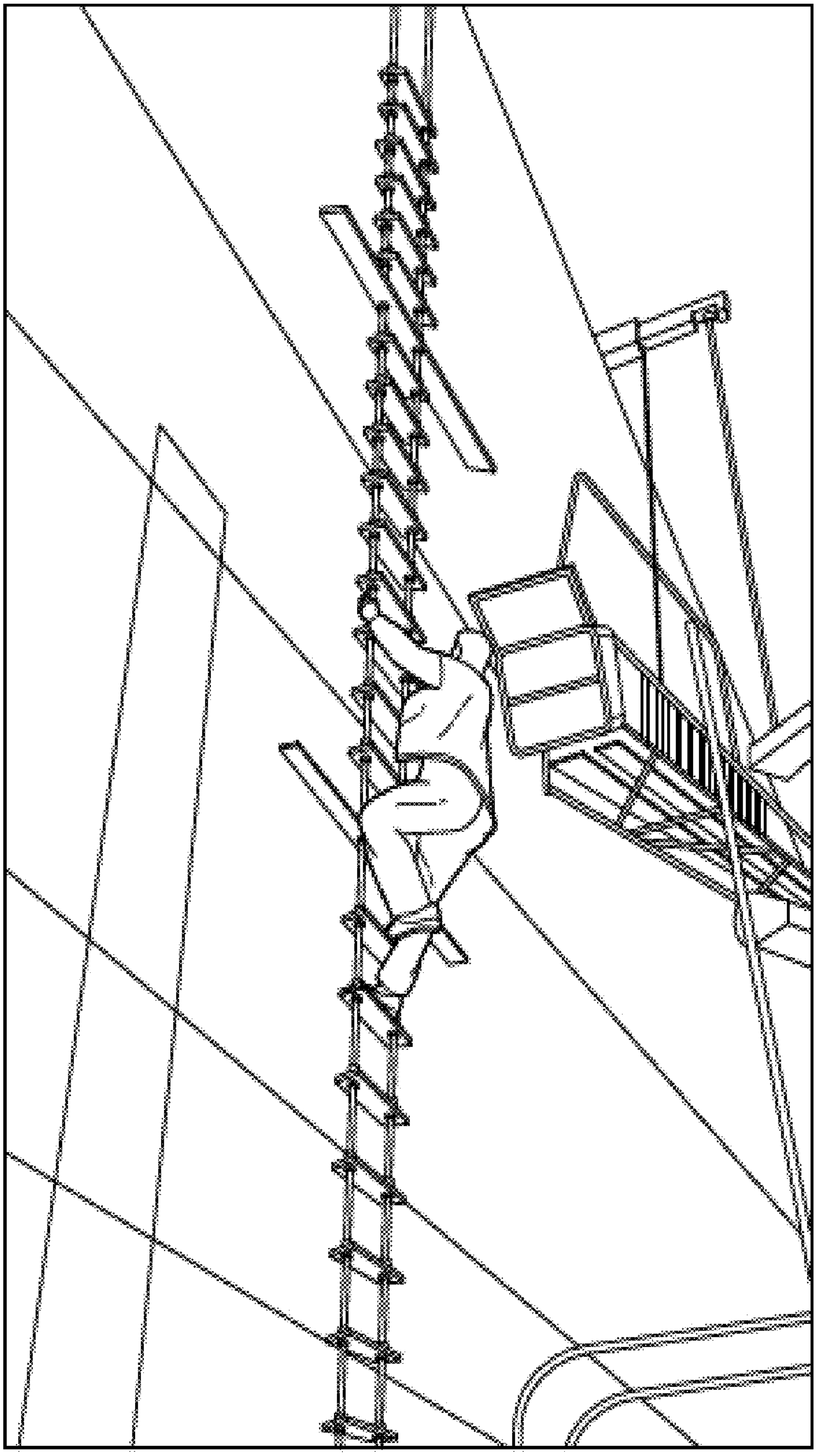
FIG. 8 shows an embodiment of the inventive ladder affixed to the side of a vessel.

The illuminated ladder 100 embodiment shown in the figures includes, for identification purposes, a left rope 102 having a proximal end 104 opposite a distal end 106. A right rope 108 has a proximal end 110 opposite a distal end 112 are also shown for identification purposes. FIG. 8 shows the inventive ladder in use.

The left rope 102 and the right rope 108 may be minimum 18 mm (0.71 in) diameter manila ropes, for example. A plurality of steps 114 is positioned at intervals along the lengths of the left rope 102 and the right rope 108. For example, the steps 114 may be hardwood, machined steps, each not more than 400 mm×115 mm×25 mm (15.75 in×4.53 in×0.98 in). The steps 114 may be positioned on the left rope 102 and the right rope 108 at 310 mm (12 in) (+−5 mm, 0.20 in) intervals.

The plurality of steps 114 defines left rope step apertures 116 and right rope step apertures 118. The left rope step apertures 116 and right step rope apertures 118 receive and secure the left side rope 102 and the right rope 108.

The illuminated ladder comprises a plurality of lights. In a preferred embodiment, the lights are low voltage so as to reduce energy expenditure. In one or more embodiments, the lights may be different voltages based on the location of the light on the ladder. In one or more embodiments, LED lights are used. However, any suitable type of source may be used.

In one embodiment, a plurality of step light recesses 120 are defined by each step 114 and are operable to receive and secure a step light 122. A plurality of step lights 122 is positioned within the plurality of step light recesses 120. The step light recesses 120 are sized so as to allow the step lights 120 to be flush with the steps.

Figure 3:
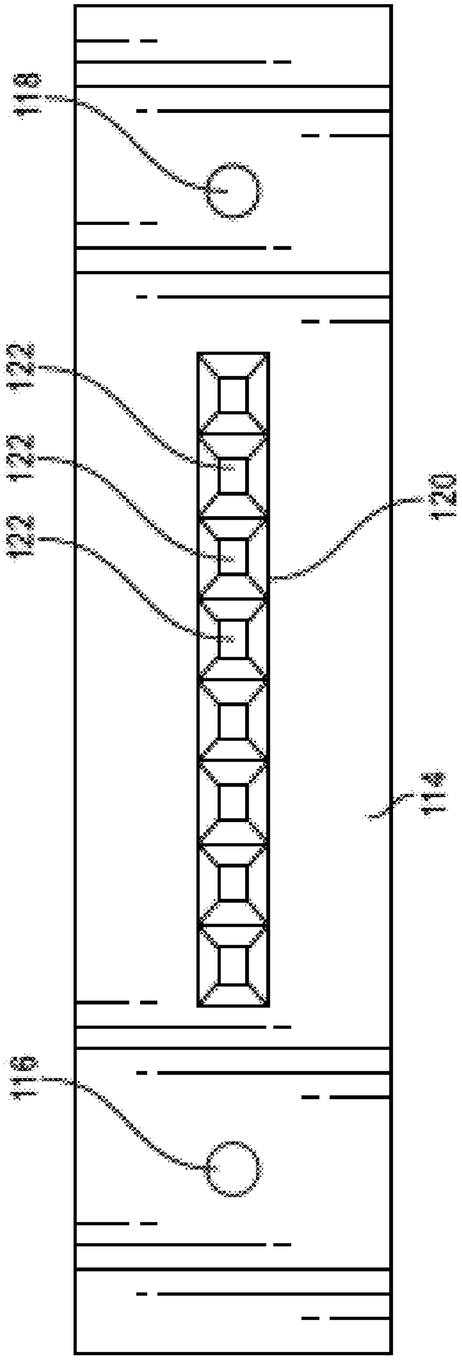
FIG. 3 shows a step with a secure step light.
Figure 4:
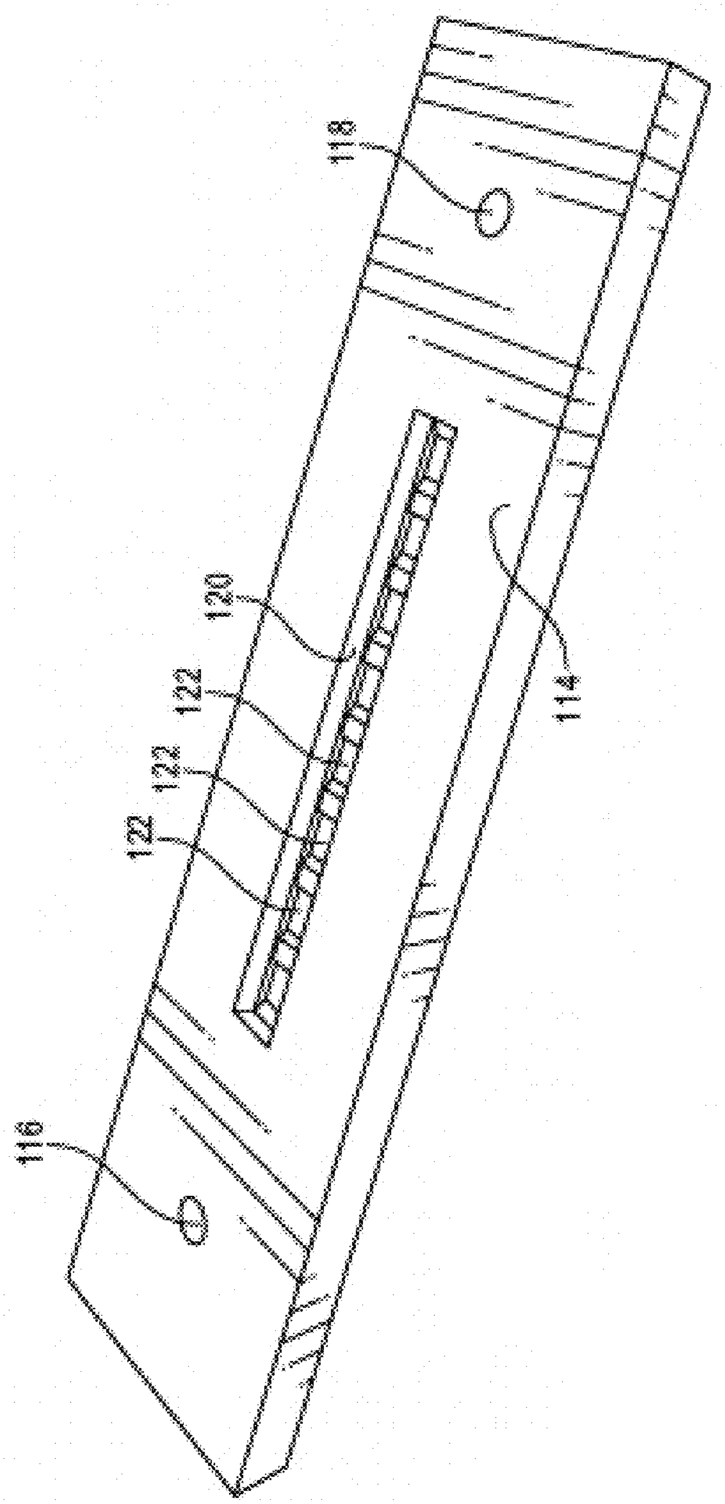
FIG. 4 is another view of the step shown in FIG. 3.

A strip of step lights may be used as shown in FIGS. 3 and 4. However, the step light recesses 120 may be shorter and spaced throughout the step to allow for a user to securely grab and place a foot on the step. Plastic caps with grooves or ridges may also be used to support the user's grip and foot placement on the step.

Figure 2:
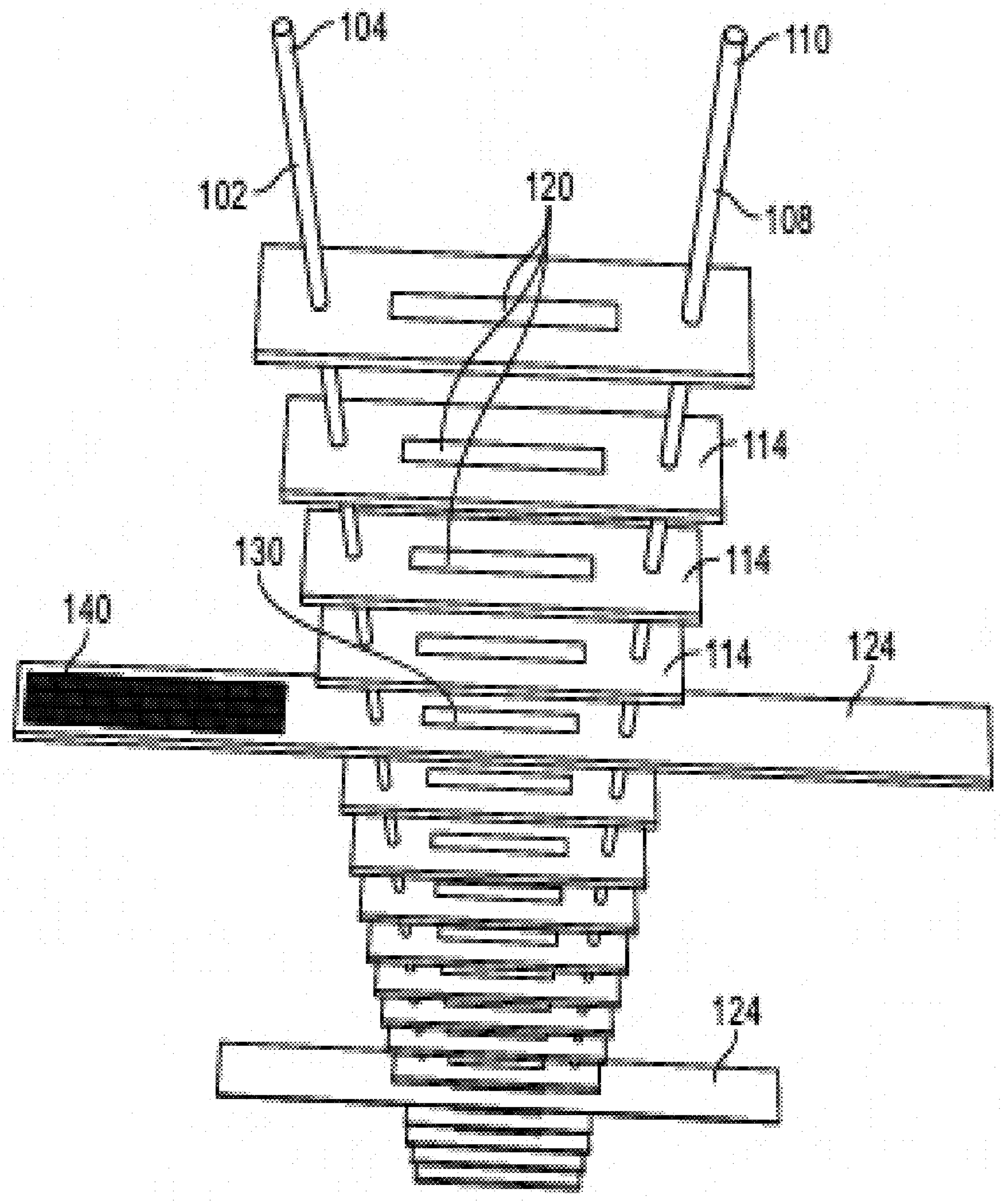
FIG. 2 is another view of the ladder of FIG. 1 that shows the power source.

In one or more embodiments, a plurality of spreaders 124 is positioned at intervals along the lengths of the left rope 102 and the right rope 108. In one embodiment, at a maximum interval of eight steps, the steps 114 are replaced by the spreaders 124, which is an elongated version of the standard machined step, with a minimum length of 1.8 m (5 ft 11 in). This is shown in FIGS. 1 and 2.

The spreaders 124 function to prevent the ladder 100 from twisting in the prevailing weather conditions when in use. The plurality of spreaders 124 each define left rope spreader apertures 126 and right rope spreader apertures 128. The left rope spreader apertures 126 and right rope apertures 128 receive and secure the left rope 102 and the right rope 108.

Similar to the step light recesses 120 and step lights 122, a plurality of spreader light recesses 130 are defined by each spreader 124 and are operable to receive and secure spreader lights 132. A plurality of spreader lights 132 is positioned within the plurality of spreader light recesses 130.

Figure 5:
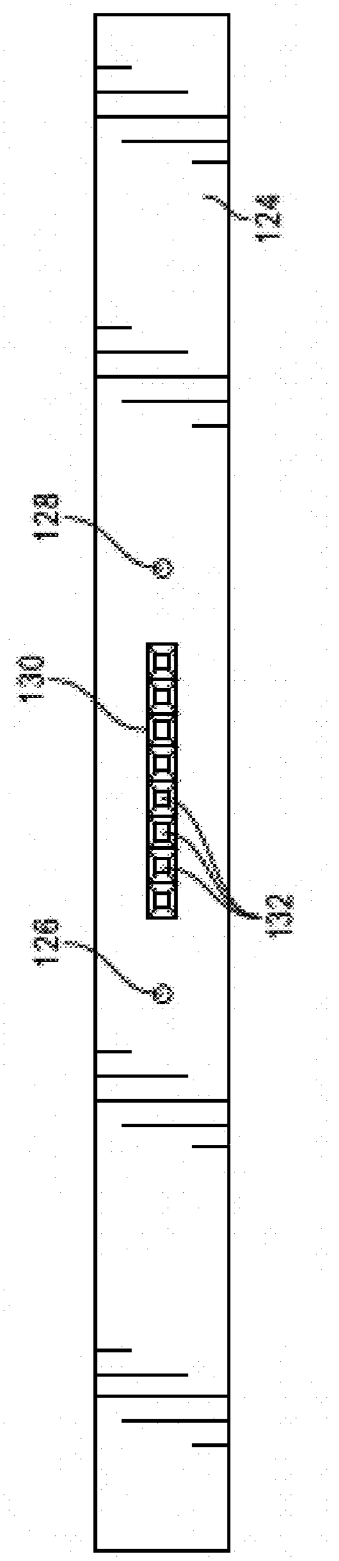
FIG. 5 shows a spreader with a spreader light.
Figure 6:
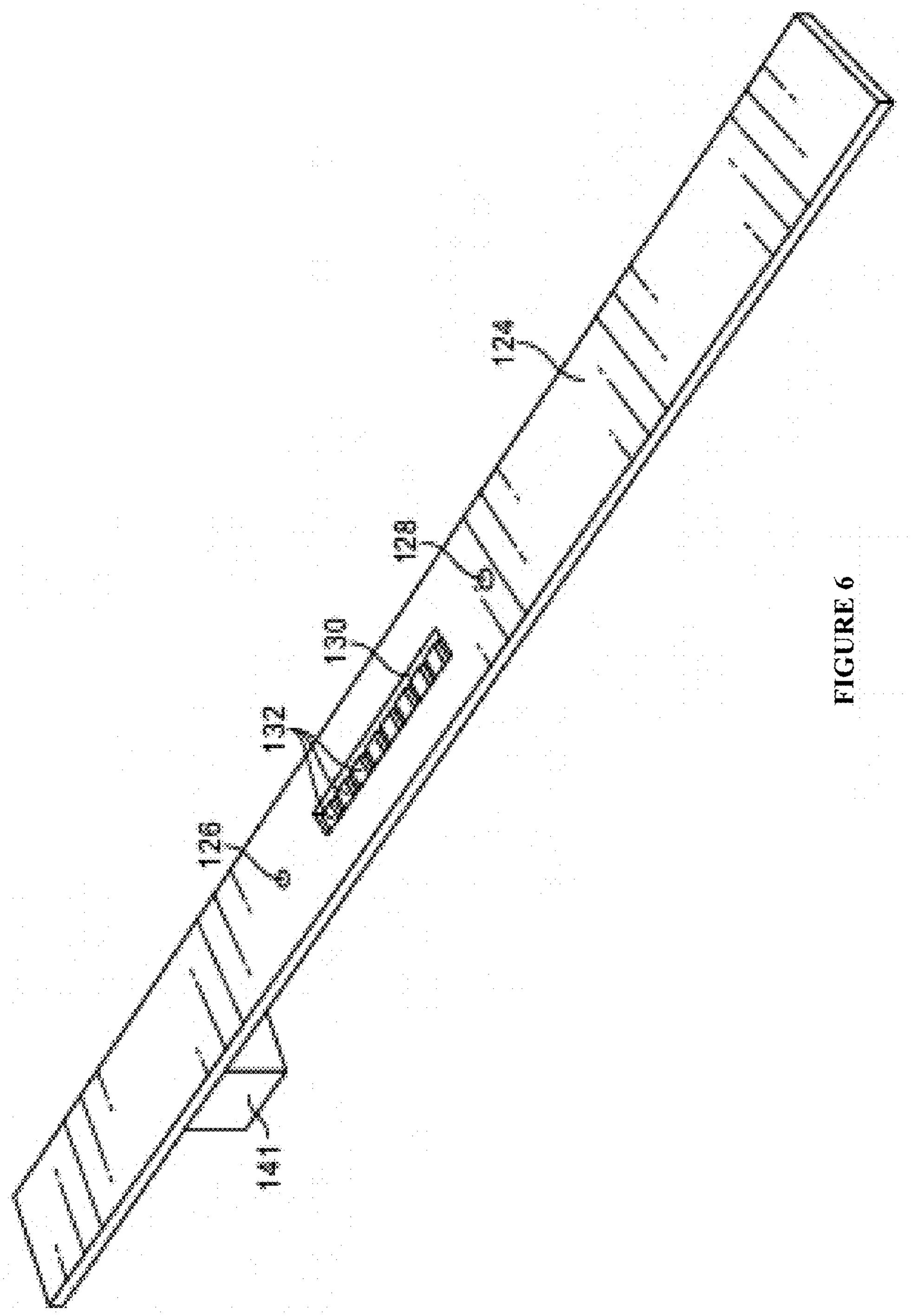
FIG. 6 shows another view of the spreader of FIG. 5.

The spreader light recesses 130 are sized so as to allow the spreader lights 132 to be flush with the spreaders. A strip of spreader lights 132 may be used as shown in FIGS. 5 and 6. However, the spreader light recesses 130 may be shorter and spaced throughout the spreader to allow for a user to securely grab and place a foot on the spreader. Plastic caps with grooves or ridges may also be used to support the user's grip and foot placement on the spreader.

Figure 7:
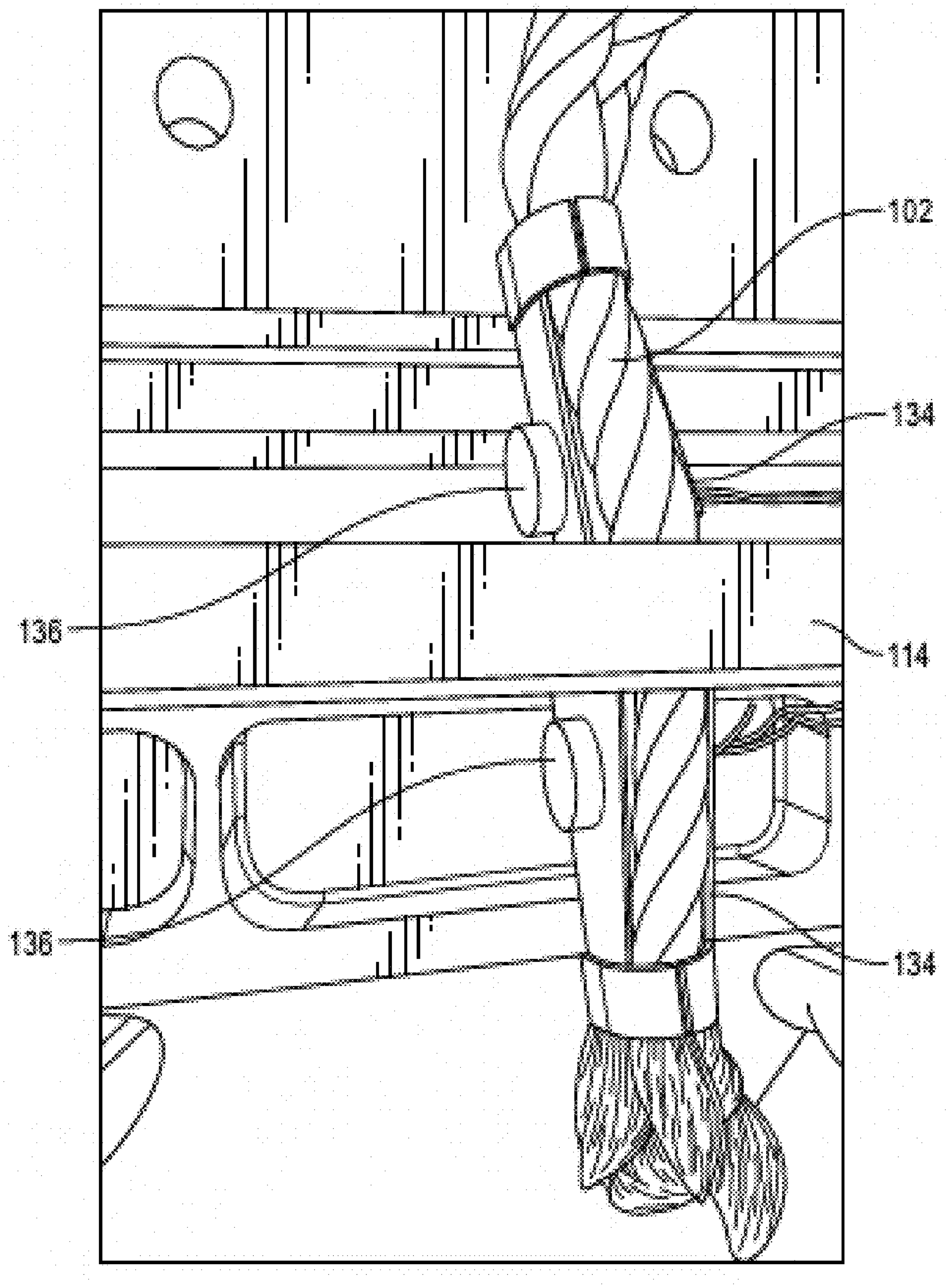
FIG. 7 shows an embodiment of the inventive ladder with clamp lights.

Another embodiment of the invention is shown in FIG. 7, a plurality of clamps 134 are operable to secure each of the plurality of steps 114 and each of the plurality of spreaders 124 to the left rope 102 and the right rope 108. A plurality of clamp lights 136 are attached to each of the plurality of clamps 134. In one or more embodiments, these clamp lights 136 are located on the top, bottom, front, and/or back, of the rope. The clamp lights 136 may be moved to provide better lighting. The clamp lights 136 are also removably attached so as to be replaced easily.

In one or more embodiments, the clamp lights 136 may be located in any suitable position on the steps 114 or spreaders 124.

In one or more embodiments, any combination of a plurality of spreader lights 132, step lights 120, and clamp lights 136 may be used. In some embodiments, some combination of the aforementioned lights may be affixed so as to shine outwards to alert an approaching vessel or dock to the ladder.

In one or more embodiments, an electronic power supply integrates with the vessel's on-board electrical outlets. The power supply may be compatible with an HNA range, 200-250V, 10-amp connection. A converter may be used to bring down voltage as necessary.

In one embodiment, the illuminated ladder 100 includes a wiring harness operable to transmit power to the plurality of step lights 122, the plurality spreader lights 132, and the plurality of clamp lights 136. In embodiment, the wiring harness is substantially integrated into the left rope 102 and the right rope 106. In one or more embodiments, the wiring is located in a channel on one or more steps and/or spreaders so that the wiring is substantially flush with the step and/or spreader. In one or more embodiments, the wiring is located on the underside of a step or spreader to avoid interfering with the grip or friction needed for climbing the ladder.

In one embodiment, the illuminated ladder 100 includes a power source 140 operable to power the plurality of step lights 122, the plurality spreader lights 132, and the plurality of clamp lights 136. In some embodiments, the power source is located on a spreader 124 and powers lights located on 1 to 4 or more steps 114 above or below the spreader 124. In some embodiments, the power source located on a spreader 124 powers up to 8 steps located above and/or below the spreader 124.

In one or more embodiments, solar panels may be used in combination with other power sources. For example, the power source 140 may be local to the ladder and may receive and transmit power from a vessel, or selectively alternate between each power source.

The power source may include DC connection that allows a plug in from either the top or bottom of the ladder. The power source may be controlled by a control panel. The control panel may be located on the ladder or fixed to the vessel. In one or more embodiments, the power source is remote controlled. In alternate embodiments, the lights may be controlled via a switch or other control mechanism. In one or more embodiments, the lights may be actuated automatically, either through the use photoreceptors in order to detect when it gets dark or through a failsafe that is actuated by power loss on the vessel or when a battery powering the lights dies, or some combination thereof.

Figure 9:
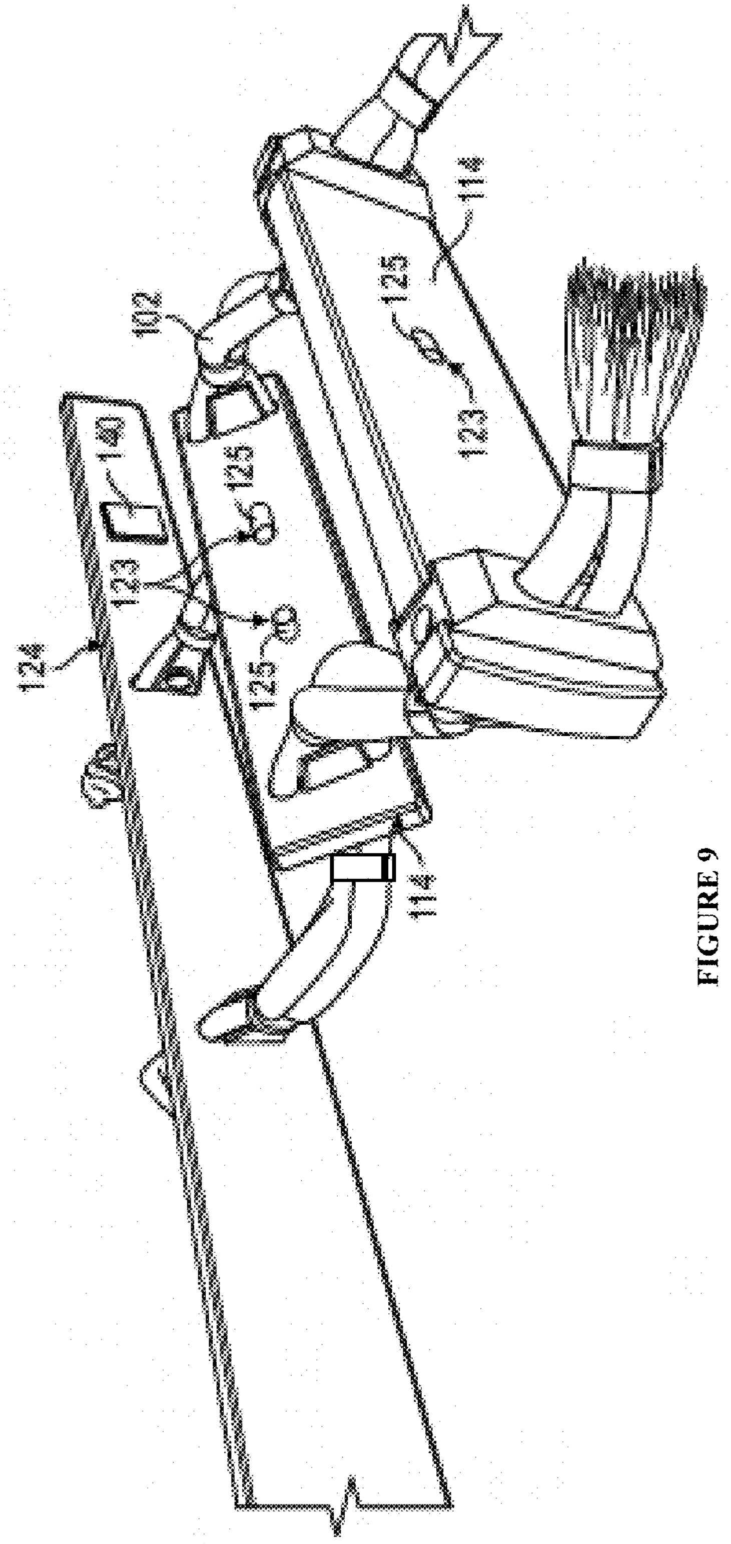
FIG. 9 shows an embodiment of the inventive ladder with pop-out lights.

FIGS. 2 and 9 shows a solar panel power source 140 located on a spreader 124. In this embodiment, the spreader 124 further comprises a power source recess in order to house the solar panel power source 140. In one or more embodiments, a plurality of solar panel power sources 140 are located on a plurality of steps and/or spreaders. In other embodiments, the solar panel power source 140 is located within a step light recess 120 or spreader light recess 130 either together with or replacing the step light 122 or spreader light 132.

In one embodiment, the solar panel power sources 140 are located on alternating sides and/or alternating faces of the spreaders 124 and steps 114 in order to allow the ladder 100 to be unfurled without regard to orientation. In other embodiments, the solar panels may be part of a modular power source that can be removed and reattached.

In one or more embodiments, a solar panel power source 140 is located on either side of the spreader 114. In a preferred embodiment, the solar panel power source 140 is located on a spreader 114 on the outside of the ropes. By locating the solar power panel source 140 outside of the grip area of the spreader 114, it allows the spreader 114 to maintain proper friction. This configuration also allows the solar panels to be energized while the ladder 100 is rolled for storage. Additionally, one solar panel power source 140 may be located on the left and right side of a spreader 114 to maintain balance.

Figure 10:
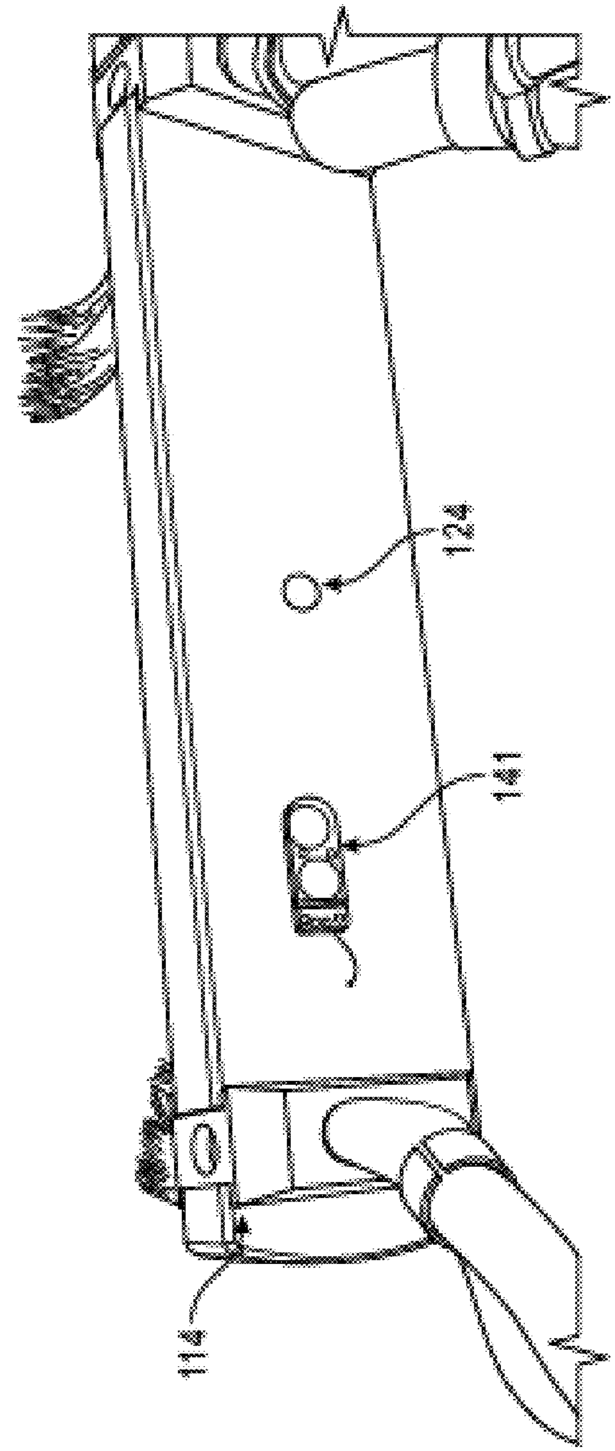
FIG. 10 shows another view of the embodiment in FIG. 9.

In one or more embodiments, a re-chargeable battery 141 is integrated with the power source 140 to provide reserve power to a plurality of the lights. Suitably, the re-chargeable battery is located beneath a step 114 or spreader 124 in order to shield the battery 141 from water damage as shown in FIGS. 6 and 10, for example. In one or more embodiments, the battery 141 is removable and may be recharged by a separate power source. Preferably, the battery is encased within a battery pack that is waterproof.

FIGS. 9 and 10 show another embodiment of the inventive ladder wherein the lights are recessed circle lights 123. As shown in the figures, one or two circle lights 123 are placed along one or more steps 114. The circle lights 123 are preferably spaced toward the center of the step 114 for maximum illumination, although they may spread further towards the left and right ends of the step 114. In other embodiments, more circle lights 123 may be placed in a row along the step 114, staggered, in a circular pattern, facing out from the step 114, or in any manner that will provide sufficient light while maintaining a sufficient amount of friction on the surface of the step 114.

One or more circle lights 123 may also be placed on one or more spreaders 124 in a manner similar to the step 114. It may be advantageous to place more circle lights 123 near outer the edges of the spreader 124 to avoid constant contact from use. It may also be advantageous to place the circle lights 123 near other components such as the power source 140 or battery 141 to alert the user to the location of these other components.

In one or more embodiments, the circle lights 123 are easily accessible to a user in order to replace the circle lights 123. As shown in FIG. 9, a thumb notch or other aperture 125 allows the user to easily access the circle lights 123 and "pop out" or remove the circle lights 123. In one or more embodiments, the aperture 125 is an extension of the step or spreader recess. In one or more embodiments, the aperture is shallower than the step or spreader recess.

For the purpose of understanding the Illuminated Marine Ladder, references are made in the text to exemplary embodiments of an Illuminated Marine Ladder, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The invention claimed is:

1. An illuminated marine pilot ladder for use as access to a marine vessel, comprising:

a) a plurality of steps positioned at intervals along the lengths of two ropes;

b) a plurality of step light recesses defined by each said step, said plurality of step light recesses operable to receive and secure at least one step light and said plurality of step light recess comprising a thumb notch;

c) a plurality of spreaders positioned at intervals along the lengths of said ropes wherein the area between said two ropes defines a plane;

d) a plurality of spreader light recesses defined by each said spreader, said plurality of spreader light recesses operable to receive and secure at least one spreader light and said plurality of spreader light recess comprising a thumb notch; and e) at least one power source comprising at least one solar power device located on at least one of said plurality of spreaders at a position outside of said plane, and at least one photoreceptor device, wherein said at least one solar power device is operable to power at least one of the step lights or spreader lights, wherein said at least on e power source is operable to selectively receive power from said at least one solar power device when actuated by said at least one photoreceptor or power from a marine vessel.

2. The illuminated marine pilot ladder of claim 1, wherein said power source is connected to a wiring harness, wherein said wiring harness is substantially integrated into said two ropes.

3. The illuminated marine pilot ladder of claim 1 wherein at least one of said step light recesses and said spreader light recesses is shaped so as to receive a circular light and said thumb notch allows each of said circular lights to be accessed and removed.

4. The illuminated marine pilot ladder of claim 1 wherein a portion of said plurality of step lights are positioned on opposing sides of said steps and wherein a portion of said plurality of spreader lights are positioned on opposing sides of said spreaders.

5. The illuminated marine pilot ladder of claim 1 wherein the at least one power source is located on at least one of said plurality of spreaders and powers said plurality of spreader lights located on one said plurality of spreaders and said plurality of step lights located on between one and eight steps.

* * * * *